United States Patent Office 2,787,535
Patented Apr. 2, 1957

2,787,535
PROCESS OF PRODUCING IRON CONTAINING MANGANESE

Robert Doat, Liege, Belgium, and Karl Heimberg, Mulheim an der Ruhr, and Max Paschke, Aachen, Germany, assignors to Compagnie Generale de Conduites d'Eau, Liege, Belgium No Drawing. Application November 3, 1953,
Serial No. 390,086

Claims priority, application Germany November 4, 1952

4 Claims. (Cl. 75—43)

The present invention relates to a process of producing iron with a relatively high manganese content and more particularly to a process of producing manganese-containing iron utilizing relatively inexpensive raw materials.

The known processes of producing manganese-containing iron resulted in a relatively high loss of manganese in the slag. Although silicon was utilized to transform manganiferous substance in the charge into manganese which alloys with the iron, a large amount of the silicon was transformed to silica ($SiO_2$) which passed in this form into the slag before reacting with the manganiferous substance of the charge. Thus, the known processes resulted in a loss of both silicon and manganese into the slag so that the production of manganese-containing iron was relatively expensive.

It is therefore an object of the present invention to provide a process of producing manganese-containing iron while avoiding loss of manganese and silicon from the charge into the slag.

It is another object of the present invention to provide a process of producing manganese-containing iron starting from relatively cheap raw material without substantial loss of manganese or silicon from the charge.

It is still another object of the present invention to provide a process of producing manganese-containing iron starting from relatively inexpensive raw iron-containing material having a high sulfur content whereby the resulting iron not only has a high manganese content but is also desulfurized by the process of the present invention.

Other objects and advantages of the present invention will be apparent from a further reading of the specification and of the appended claims.

With the above objects in view, the present invention mainly comprises a process of producing iron containing manganese, comprising the steps of introducing into a cupola furnace an iron-containing material containing silicon, a manganiferous substance and an excess of carbon, passing a heated fluid containing oxygen into the thus charged cupola furnace while maintaining a reducing atmosphere in the same due to the excess of carbon, thereby melting the iron-containing material containing silicon in a reducing atmosphere in the cupola furnace while preventing oxidation of the silicon, and passing the thus molten iron-containing material through a molten slag in the cupola furnace, the molten slag being of sufficient depth to cause substantially complete reduction of the manganiferous substance by the silicon to manganese, thereby obtaining iron having a high manganese content.

Preferably the fluid containing oxygen, which is preferably air or air enriched with oxygen, is pre-heated to a temperature of about 400° C. or more before being introduced into the cupola furnace.

It is further preferred according to the present invention that the lining of the cupola furnace be either basic or neutral so that continuous use of the cupola furnace does not cause undesirable products from the lining to go into the slag.

According to another embodiment of the present invention it is preferred to maintain a basic slag bath which in addition to being advantageous in the basic process of the present invention is also of advantage when utilizing cheap raw materials such as a raw material having a high sulfur content in effecting the de-sulfurization of the raw materials. The maintaining of the basicity of the slag bath is helped by the utilization of the reducing atmosphere, which by preventing the oxidation of the silicon to silica prevents the acidification of the slag bath by silica. The basicity may be further enhanced if necessary by the addition of basic substances such as limestone and the like to the charge.

It is further preferred according to the present invention to maintain the slag bath of predetermined constant depth, i. e. by means of siphons or the like at set levels in the cupola furnace so that the resulting product is always uniform. In any case, however, the slag bath must be of sufficient depth for all of the manganiferous substances in the charge to be reduced by the silicon to manganese before the molten material completes its passage through the slag bath. The particular depth which is necessary for any particular charge may be easily determined either by calculation, by simple pre-testing or from experience. Generally a slag bath of 60 cm. and more will be suitable.

Of primary importance according to the present invention is the maintaining of a reducing atmosphere in the cupola furnace. This is maintained by utilizing in the charge an excess of carbon over the amount necessary for normal fusion operation so that either the carbon in the charge is not completely oxidized to carbon dioxide or carbon dioxide which is formed is reduced by the excess carbon to carbon monoxide, thus resulting in a reducing atmosphere. Of course the excess of carbon must be in relation to the amount of air introduced into the cupola and the term "excess of carbon" is meant to comprehend this within its meaning.

The fluid containing oxygen such as air which is introduced into the cupola is preferably pre-heated to a temperature of 400–600° C. so that the oxidation of the carbon in the charge results in a very high temperature despite the fact that the oxidation is not complete and that a reducing atmosphere is maintained in the furnace.

The amount of silicon in the charge is preferably in excess of the amount required to reduce all of the manganiferous substance to manganese so that although the reduction of the manganiferous substance to manganese results in a reduction in the silicon content in accordance with the following reaction:

$$2MnO SiSiO_2 2Mn$$ 

sufficient silicon will be present for the final product to have the desired silicon content.

The equilibrium of the above reaction is to the right at higher temperatures i. e. temperatures of at least 1500° C. and preferably at a temperature of about 1600° C. For this reason it is preferred to maintain the temperature of the slag bath of at least 1500° C. In addition, maintaining a temperature of at least 1500° C. is of advantage in de-sulfurizing the iron-containing material of the charge, such de-sulfurization proceeding excellently in the process of the present invention because of the reducing atmosphere, the basic slag and the high temperature of the slag.

The process of the present invention permits a much greater degree of recuperation of manganese, in other words there is much less manganese loss according to the present invention, than could be obtained by the prior processes. In addition, the silicon in the charge should be of relatively high concentration i. e. about 1–4% and preferably about 2–3% so that sufficient silicon is present to reduce the manganiferous substance to manganese in accordance with the above equation. It is pointed out that despite the reducing atmosphere in the cupola according to the present invention, the excess carbon in the charge will not reduce all of the manganiferous substances of the charge, although it will probably reduce some, so that the silicon is necessary in order to be certain of a complete reduction.

Since the reduction of the manganiferous substances by the silicon takes place in the slag bath, it is necessary that the slag bath be of sufficient depth to effect a complete reduction to manganese.

The iron-containing material which is utilized in the charge may be any iron-containing material although it is preferred to utilize a material having a high silicon content. The charge may for example contain in addition to coke, and limestone if necessary to assure a basic slag, scrap iron, old cast iron containing silicon, ferro-silicon, and substances containing manganese such as for example a manganiferous slag from a Siemens-Martin furnace, minerals containing manganese and the like. Although the manganese is found in the slag in many different forms it is generally expressed as MnO content.

The process of the present invention is particularly advantageous since it is possible to utilize as the iron-containing material large quantities of cast iron rich in sulfur and having a high silicon content, such as that obtained from the blast furnace by the acid or superacid fusion process, without preliminary de-sulfurization because the process of the present invention results in de-sulfurization of the iron in addition to incorporating manganese therein. This is of advantage from the point of view of economy since such cast iron is relatively inexpensive.

According to the present invention it is possible to utilize a cast iron particularly rich in silicon, for example steel and Thomas and Bessemer irons and to enrich these in manganese to produce a product having a high content of manganese i. e. greater than 0.8% and even higher than 1%.

Moreover, it is possible by the addition of manganiferous substances to transform mixtures poor in manganese to cast irons having a normal manganese content of 0.6–0.8% or to manufacture without loss of heat cast irons having a normal manganese content starting with iron mixtures having a normal manganese content.

The following example is given as illustrative of the process of the present invention, the scope of the present invention not however being limited to the particular details of the example.

*Example*

A cupola furnace provided with tuyeres for the introduction of heated air and being provided with siphons for the siphoning-off of the molten metal and the slag at predetermined levels so that the slag bath has a depth of about 60 cm. is charged with the following:

Scrap iron—about 75% (containing about 0.5%—Mn and 2%—Si)
Coke or the like combustibles—12%
Manganiferous slag—about 13%

The manganiferous slag which is obtained from the Martin furnace has the following composition:

| | Percent |
|---|---|
| $SiO_2$ | 25.8 |
| $Al_2O_3$ | 3.1 |
| $Fe_2O_3$ | 13.3 |
| MnO | 15.8 (Mn 12.25) |
| CaO | 36.3 |
| MgO | 3.6 |
| $P_2O_5$ | 2.3 |

The charge in the cupola is subjected to a hot blast of air at a temperature of about 500–600° C., the amount of air in relation to the carbon content of the charge being such that a reducing atmosphere is maintained in the cupola. The slag attains a temperature of about 1600° C. This process results in reduction of the MnO to Mn, the resulting iron containing approximately 2% Si and about 0.7–1% Mn.

The slag has the following approximate composition:

| | Percent |
|---|---|
| $SiO_2$ | 35.8 |
| CaO | 46.8 |
| $Al_2O_3$ | 10.3 |
| FeO | 0.7 |
| MnO | 1.4 |
| MgO | 2.1 |
| CaS | 2.7 |

The recuperation of manganese is about 85–90% of the total amount in the charge.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of producing iron containing at least 0.6% of manganese, comprising the steps of introducing into a cupola furnace a metallic iron material containing at least 1% by weight of silicon, a basic slag containing a manganiferous material, and an excess of carbon above the amount necessary for fusion; passing a heated fluid containing free oxygen into the thus charged cupola furnace while maintaining a reducing atmosphere in the same due to said excess of carbon, thereby melting said metallic iron material containing silicon in a reducing atmosphere in said cupola furnace, oxidation of said silicon being prevented due to said reducing atmosphere; and passing said molten metallic iron material through the molten basic slag containing said manganiferous material so as to cause in said basic slag reduction of said manganiferous substance by said silicon to manganese which passes into the iron, said molten basic slag being of sufficient depth to cause substantially complete reduction of said manganiferous substance by said silicon and acidification of said basic slag being prevented by said reducing atmosphere which prevents oxidation of said silicon to acid silica.

2. A process of producing iron containing at least 0.6% of manganese, comprising the steps of introducing into a cupola furnace a metallic iron material containing at least 1% by weight of silicon, a basic slag containing a manganiferous material, and an excess of carbon above the amount necessary for fusion; passing air at a temperature of 400–600° C. into the thus charged cupola furnace while maintaining a reducing atmosphere in the same due to said excess of carbon, thereby melting said metallic iron material containing silicon in a reducing atmosphere in said cupola furnace, oxidation of said silicon being prevented due to said reducing atmosphere; and passing said molten metallic iron material through the molten basic slag containing said manganiferous material so as to cause in said basic slag reduction of said manganiferous substance by said silicon to manganese which passes into the iron, said molten basic slag being of sufficient depth to cause substantially complete reduction of said manganiferous substance by said silicon and acidification of said basic slag being prevented by said reducing atmosphere which prevents oxidation of said silicon to acid silica.

3. A process of producing iron containing at least 0.6% of manganese, comprising the steps of introducing into a cupola furnace a metallic iron material containing at least 1% by weight of silicon, a basic slag containing a manganiferous material, and an excess of carbon above the amount necessary for fusion, said silicon being in an amount greater than the amount necessary to reduce all of said manganiferous substance to manganese; passing a heated fluid containing free oxygen into the thus charged cupola furnace while maintaining a reducing atmosphere in the same due to said excess of carbon, thereby melting said metallic iron material containing silicon in a reducing atmosphere in said cupola furnace, oxidation of said silicon being prevented due to said reducing atmosphere; and passing said molten metallic iron material through the molten basic slag containing said manganiferous material so as to cause in said basic slag reduction of said manganiferous substance by said silicon to manganese which passes into the iron along with the excess silicon, said molten basic slag being of sufficient depth to cause substantially complete reduction of said manganiferous substance by said silicon and acidification of said basic slag being prevented by said reducing atmosphere which prevents oxidation of said silicon to acid silica.

4. A process of producing iron containing at least 0.6% of manganese, comprising the steps of introducing into a cupola furnace a metallic iron material containing at least 1% by weight of silicon, a basic slag containing a manganiferous material, and an excess of carbon above the amount necessary for fusion, said silicon being in an amount greater than the amount necessary to reduce all of said manganiferous substance to manganese; passing a heated fluid containing free oxygen into the thus charged cupola furnace while maintaining a reducing atmosphere in the same due to said excess of carbon, thereby melting said metallic iron material containing silicon in a reducing atmosphere in said cupola furnace, oxidation of said silicon being prevented due to said reducing atmosphere; and passing said molten metallic iron material through the molten basic slag containing said manganiferous material at a temperature of at least 1500° C. so as to cause in said basic slag reduction of said manganiferous substance by said silicon to manganese which passes into the iron along with the excess silicon, said molten basic slag being of sufficient depth to cause substantially complete reduction of said manganiferous substance by said silicon and acidification of said basic slag being prevented by said reducing atmosphere which prevents oxidation of said silicon to acid silica.

References Cited in the file of this patent
UNITED STATES PATENTS

| | | |
|---|---|---|
| 28,103 | Morris et al. | May 1, 1860 |
| 1,357,780 | Koppers | Nov. 2, 1920 |